United States Patent [19]

Itoh et al.

[11] Patent Number: 5,744,039
[45] Date of Patent: Apr. 28, 1998

[54] COMPOSITE SEMIPERMEABLE MEMBRANE AND PRODUCTION METHOD THEREOF

[75] Inventors: Hiroki Itoh; Masahiko Hirose; Katsumi Ishii, all of Osaka, Japan

[73] Assignee: Nitto Denko Corporation, Osaka, Japan

[21] Appl. No.: 790,613

[22] Filed: Jan. 29, 1997

Related U.S. Application Data

[63] Continuation of Ser. No. 339,179, Nov. 10, 1994, abandoned.

[30] Foreign Application Priority Data

Nov. 12, 1993 [JP] Japan ..................... 5-283287
Oct. 27, 1994 [JP] Japan ..................... 6-263483

[51] Int. Cl.$^6$ ............. B01D 69/12; B01D 71/54; B01D 71/56
[52] U.S. Cl. ............. 210/644; 210/500.38; 210/506; 427/244
[58] Field of Search ............. 96/14; 210/490, 210/506, 500.38, 644; 264/41, DIG. 48; 427/245, 244

[56] References Cited

U.S. PATENT DOCUMENTS

| | | | |
|---|---|---|---|
| Re. 30,351 | 7/1980 | Hoehn et al. | 210/500.39 |
| 3,878,109 | 4/1975 | Ikeda et al. | 210/500.38 |
| 3,996,318 | 12/1976 | van Heuven | 210/500.38 |
| 4,005,012 | 1/1977 | Wrasidlo . | |
| 4,277,344 | 7/1981 | Cadott et al. . | |
| 4,619,767 | 10/1986 | Kamiyama et al. . | |
| 4,765,897 | 8/1988 | Cadotte et al. . | |
| 4,769,148 | 9/1988 | Fibeger et al. | 210/500.38 |
| 4,872,984 | 10/1989 | Tomaschke . | |
| 4,948,507 | 8/1990 | Tomaschke . | |
| 5,019,264 | 5/1991 | Arthur | 210/500.38 |
| 5,160,619 | 11/1992 | Yamaguchi et al. | 210/500.38 |
| 5,336,409 | 8/1994 | Hachisuka et al. | 210/500.38 |

FOREIGN PATENT DOCUMENTS

| | | |
|---|---|---|
| 49133282 | 12/1974 | Japan . |
| 5538164 | 10/1980 | Japan . |
| 5727101 | 2/1982 | Japan . |
| 5727102 | 2/1982 | Japan . |
| 6336803 | 7/1988 | Japan . |
| 1441014 | 6/1976 | United Kingdom . |

*Primary Examiner*—David A. Simmons
*Assistant Examiner*—Kenneth M. Jones
*Attorney, Agent, or Firm*—Sughrue, Mion, Zinn, Macpeak & Seas, PLLC

[57] ABSTRACT

Disclosed are a composite semipermeable membrane which is excellent in the chlorine resistance and also gives a high desalting faculty and a large water flux, in particular, under a low operation pressure and a production method thereof. The composite semipermeable membrane comprises a porous base material having formed thereon a semipermeable thin film formed by crosslinking polymerization of 2,6-diaminotoluene monomer or a mixture of 2,6-diaminotoluene monomer and other amino compound monomer with a polyfunctional crosslinking agent having at least two functional groups capable of reacting with the amino group(s) of the monomer(s) in one molecule in the presence of an amine salt.

17 Claims, No Drawings

COMPOSITE SEMIPERMEABLE MEMBRANE AND PRODUCTION METHOD THEREOF

This is a Continuation of application Ser. No. 08/339,179 filed Nov. 10, 1994 now abandoned.

FIELD OF THE INVENTION

The present invention relates to a composite semipermeable membrane for selectively separating a mixture of various kinds of liquids and a production method thereof, and more specifically to a composite semipermeable membrane composed of a porous base material having formed thereon a semipermeable thin membrane formed by conducting crosslinking polymerization of 2,6-diaminotoluene monomer or a mixture of the monomer and other amino compound monomer with an amine salt in the presence of a polyfunctional crosslinking agent, and to a production method thereof.

The composite semipermeable membrane according to the present invention can be preferably used for production of fresh water by desalting brackish water, seawater, etc. or ultra-pure water which is required in production of semiconductors.

BACKGROUND OF THE INVENTION

Recently, as a reverse osmosis membrane, various composite semipermeable membranes each obtained by forming a thin film having a semipermeability on a porous base material are proposed.

Such a semipermeable membrane is generally produced by coating an aqueous solution of a reactive substrate on a porous base material and thereafter, contacting the coated layer with a solution of a polyfunctional crosslinking agent such as tolylene diisocyante, isophthaloyl chloride, trimesic acid chloride, etc., dissolved in a water-immiscible organic solvent such as hexane to cause an interfacial reaction of the reactive substrate and the crosslinking agent at the interface between the aqueous phase and the organic phase, thereby to form a thin film (precise layer) having a semipermeability.

Practically, for example, a composite semipermeable membrane using a polysulfone ultrafiltration membrane as the porous base material and polyethyleneimine as the reactive substrate as described in JP-A-49-133282 (the term "JP-A" as used herein means an "unexamined Japanese patent application"), a composite semipermeable membrane using the foregoing porous base material and amine-modified epichlorohydrin as the reactive substrate as described in JP-B-55-38164 (the term "JP-B" as used herein means an "examined published Japanese patent application"), a composite semipermeable membrane using the foregoing porous base material and a mixture of a water-soluble polymer such as polyethyeneimine, etc., and a polyamino compound monomer as described in JP-A-57-27101 and JP-A-57-27102, a composite semipermeable membrane composed of the porous base material having formed thereon a thin film composed of an polyamide obtained by the interfacial polymerization of a polyfunctional aromatic amine and a polyfunctional acid halide as described in JP-B-63-36803 are known.

These known composite semipermeable membranes all show the faculty as the semipermeable membrane only in the case of operating under the operation pressure of generally at least 15 kg/cm$^2$ and in particular, under a high pressure of from 40 kg/cm$^2$ to 70 kg/cm$^2$ and hence in the case of aiming at desalting of an aqueous solution having a low osmosis pressure, such as brackish water and reclamation water, there is a problem that an operation cost and the plant cost are increased.

Recently, a desalination and water reuse system having more increased economy has been required and the conventional composite semi-permeable membranes can not satisfy the requirement. Also, for washing off organic contaminants on the surface of the semipermeable membrane, it is generally practiced to wash the surface with an oxidizing agent such as chlorine and an aqueous hydrogen peroxide solution and hence if the chlorine resistance of the membrane is weak, the deterioration of the membrane is accelerated to quickly lower the desalting faculty and the water permeability of the membrane. That is, a composite semipermeable membrane which is excellent in the chlorine resistance and also gives a high desalting faculty and a large water flux under a lower operation pressure has been required. Practically, a composite semipermeable membrane capable of giving a water flux of at least 0.4 m$^3$/m$^2$ per day while keeping the desalting faculty of a salt rejection of at least 80% under a very low operation pressure of, e.g., 5 kg/cm$^2$ has been required.

SUMMARY OF THE INVENTION

The present invention has been made for solving these problems and the object of the present invention is to provide a composite semipermeable membrane which is excellent in the chlorine resistance and also gives a high desalting faculty and a large water flux, in particular, under a low operation pressure and also to provide a production method thereof.

It has now been discovered that the object described above can be achieved by the present invention described hereinbelow.

That is, according to one aspect of the present invention, there is provided a composite semipermeable membrane comprising a porous base material having formed thereon a semipermeable film formed by conducting crosslinking polymerization of 2,6-diaminotoluene monomer or a mixture of 2,6-diaminotoluene monomer and other amino compound monomer with a polyfunctional crosslinking agent having at least two functional groups capable of reacting with the amino group(s) of the foregoing monomer(s) in one molecule in the presence of an amine salt. Also, as a preferred constitution, the composite semipermeable membrane has a faculty of a salt rejection of at least 80% to an aqueous solution of 1500 ppm of sodium chloride in the operation under the condition of 25° C. and an operation pressure of 5 kg/cm$^2$ together with a faculty of water flux of at least 0.4 m$^3$/m$^2$ per day.

According to another object of the present invention, there is provided a production method of a composite semipermeable membrane, which comprises coating or impregnating a porous base material with a solution containing 2,6-diaminotoluene monomer or a mixture thereof with other amino compound monomer and an amine salt and thereafter contacting the coated or impregnated layer with a polyfunctional crosslinking agent having at least two functional groups capable of reacting with the amino group(s) in the monomer(s) in one molecule to form a semipermeable thin film on the porous base material by causing a crosslinking polymerization. Also, as a preferred constitution, the composite semipermeable membrane obtained by the production method of the present invention has a faculty of a salt rejection of at least 80% to an aqueous solution of 1500 ppm of sodium chloride in the operation under the condition of 25° C. and an operation pressure of 5 kg/cm² together with a faculty of a water flux of at least 0.4 m³/m² per day.

DETAILED DESCRIPTION OF THE INVENTION

There is no particular restriction on the porous base material being used in this invention if the base material can support thereon a thin film but usually a ultrafiltration film having fine pores of from 1 to 50 nm on the surface thereof is used. Examples of the material being used as the porous base material are polysulfone, polyether sulfone, polyacrylonitrile, polyimide, polyamide, an ethylene-vinyl alcohol copolymer, and cellulose acetate but from the points of the heat resistance, the chlorine resistance, etc., polysulfone and polyether sulfone are preferred. Also, such a porous film may be reinforced by backing with a woven fabric or nonwoven fabric.

2,6-Diaminotoluene being used in the present invention is commercially available. As other diaminotoluene, 2,4-diaminotoluene and 2,5-diaminotoluene are also commercially available but as will be described later, since the composite semipermeable membrane obtained by using 2,4-diaminotoluene or 2,5-diaminotoluene is inferior in the chlorine resistance to that of the composite semipermeable membrane obtained by using 2,6-diaminotoluene, the use of 2,4-diaminotoluene and 2,5-diaminotoluene is unsuitable for practical use.

As other amino compound monomer than 2,6-diaminotoluene monomer being used in the present invention, an aliphatic, alicyclic, aromatic or heteroaromatic compound having at least two primary amino groups and/or secondary amino groups in one molecule and having a solubility of at least 0.05% by weight to water, an aliphatic alcohol having from 1 to 4 carbon atoms, or a mixed solvent thereof at room temperature is desirable. Practical examples of the preferred amino compound monomer are m-phenylenediamine, N,N'-dimethyl-m-phenylenediamine, 2,4-diaminopyridine, 2,4,6-trimethyl-m-phenylenediamine, 4,4-diaminophenylsulfone, piperazine, and aminopiperidine and in these compounds, m-phenylenediamine is more preferably used.

These amino compound monomers each may have a functional group such as a methoxy group, a chlorine atom, a carboxyl group, etc., and they can be used singly or as a mixture of them.

As to the mixing ratio of the other amino compound monomer and 2,6-diaminotoluene, it is preferred that the content of the other amino compound monomer is not more than 60% by weight to the content of 2,6-diaminotoluene monomer, i.e., that the other amino compound is used in an amount corresponding to 60% by weight or less of the content of 2,6-diaminotoluene monomer. If the content of the other amino compound monomer is over 60% by weight, the influence of the other amino compound monomer to the membrane faculty becomes dominant, whereby the feature of using 2,6-diaminotoluene giving a high water flux even at a very low operation pressure is sometimes restrained. For example, in the case that the other amino compound monomer is m-phenylenediamine, as will be described later in Comparative Examples 6 to 8, when the content of m-phenylenediamine is over 60% by weight to the content of 2,6-diaminotoluene, it sometimes happens that the water flux of the membrane faculty is reduced. Accordingly, in order that the composite semipermeable membrane has a high water flux even under a very low operation pressure of 5 kg/cm², the mixing ratio of the other amino compound monomer is preferably not more than 60% by weight, and more preferably not more than 50% by weight to the amount of 2,6-diaminotoluene.

The amine salt being used in the present invention may be a salt of an amine and an acid. Examples of the amine include trimethylamine, triethylamine, 1-methylpiperizine, and N,N'-dimethylethylamine. Also, examples of the acid include aromatic sulfonic acid, an aliphatic sulfonic acid, camphorsulfonic acid, hydrochloric acid, and sulfuric acid.

In the present invention, the amine salt composed of triethylamine and camphorsulfonic acid is preferably used.

The amine salts composed of these amines and acids are used as water-soluble solids or aqueous solutions of the amine salts. The aqueous solution of the amine salt is preferred.

The polyfunctional crosslinking agent being used in the present invention is a compound having at least two functional groups capable of reacting the amino group of 2,6-diaminotoluene or the amino groups of 2,6-diaminotoluene and the foregoing other amino compound monomer in one molecule and specific examples of the functional group are an acid halide group, an acid anhydride group, an isocyanate group, a halogensulfonyl group, a haloformate group, and an N-haloformyl group.

Accordingly, specific examples of the preferred polyfunctinal crosslinking agent being used in the present invention are isophthaloyl chloride, terephthaloyl chloride, and compound (a) to (m) shown below, and a mixture of them.

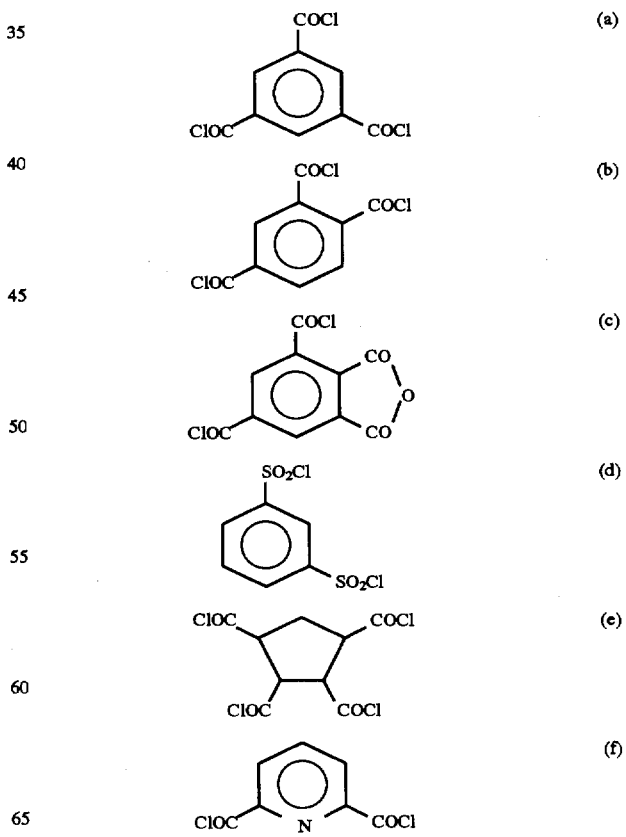

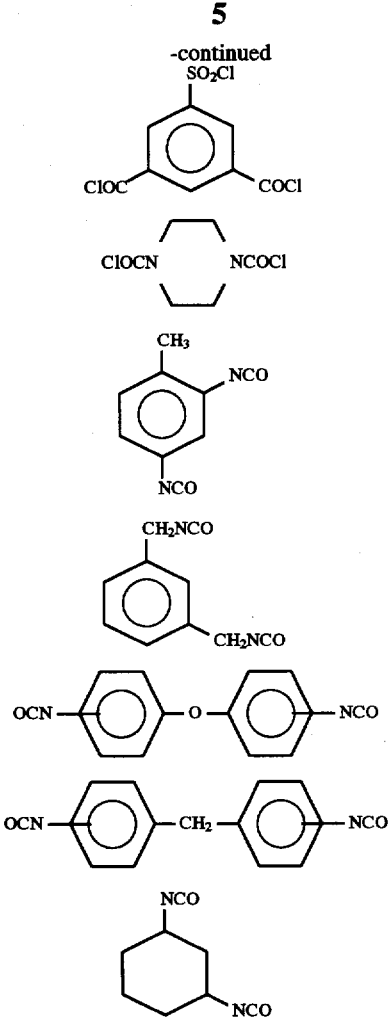

In the present invention, from the point of increasing the rejection faculty of the membrane, the compound having at least two acid halide groups in one molecule, such as isophthaloyl chloride, trimesic acid chloride, cyclopnetane-tetracarboxylic acid chloride, etc., is preferably used and trimesic acid chloride is more preferably used.

In the case of producing the composite semipermeable membrane of the present invention, 2,6-diaminotoluene monomer or a mixture of 2,6-diaminotoluene monomer and the foregoing other amino compound monomer are crosslinking polymerized with the foregoing polyfunctional crosslinking agent in the presence of the foregoing amine salt on the porous base material to form a semipermeable super-thin film. The thickness of the semipermeable thin film is preferably from 100 to 500 nm. The semipermeable thin film is formed by coating or impregnating the porous base material with a solution containing 2,6-diaminotoluene monomer or a mixture of 2,6-diaminotoluene, the foregoing other amino compound monomer, and the foregoing amine salt (hereinafter, the solution is referred to as base liquid) and then contacting the coated or impregnated layer with the foregoing polyfunctional crosslinking agent to cause a crosslinking polymerization. The contacting can be conducted by conventional methods such as an immersing method and a spraying method. In addition, at the crosslinking polymerization, it is preferred to heat the system for completing the crosslinkage.

As the solvent for the foregoing base liquid, any solvent may be used as long as it does not have bad influences on the porous base material and is immiscible with the solvent for the polyfunctional crosslinking agent described below, and water is preferably used.

The concentration of 2,6-diaminotoluene monomer in the base liquid described above is usually from 0.05 to 10% by weight, and preferably from 0.5 to 5% by weight. The concentration of the amine salt in the base liquid is generally from 1 to 15% by weight, preferably from 4 to 12% by weight.

Also, for lowering the surface tension of the base liquid and improving the wetting property of the liquid at coating or impregnating the porous base material with the base liquid, the base liquid can contain a surfactant. Specific examples of the surfactant are sodium dodecylbenzenesulfonate and sodium laurylsulfate.

There is no particular restriction on the solvent for the polyfunctional crosslinking agent being used in this invention if the solvent dissolves well the polyfunctional crosslinking agent being used, is immiscible with the solvent for the foregoing basic liquid, and does not dissolve or swell the composite semipermeable membrane being treated, and an aliphatic or alicyclic hydrocarbon having from 5 to 10 carbon atoms is preferably used. Specific examples of the solvent are pentane, hexane, heptane, octane, cyclopentane, cyclohexane, and petroleum ether. The concentration of the crosslinking agent in the crosslinking agent solution is usually from 0.05 to 5% by weight, and preferably from 0.1 to 2% by weight.

Also, in the crosslinking polymerization, for more sufficiently carrying out crosslinking, that is, for completing the crosslinking polymerization by the polyfunctional crosslinking agent and 2,6-diaminotoluene or a mixture of 2,6-diaminotoluene and the foregoing other amino compound monomer, it is preferred to carry out a heat treatment. Usually, the heating temperature is from 60° C. to 160° C. and the heating time is usually from about 1 minute to 30 minutes.

Then, the following examples are intended to illustrate the present invention in more practically but not to limit it in any way.

EXAMPLE 1

An aqueous solution containing 2.0% by weight 2,6-diaminotoluene, 2.0% by weight triethylamine, 4.0% by weight camphorsulfonic acid, and 0.25% by weight sodium laurylsulfate was coated on a porous base material composed of a polysulfone ultrafiltration membrane and then the excessive liquid was removed. Then, after contacting the coated layer with a solution, IP-1016 (isoparaffinic hydrocarbon oil, trade name, made by Idemitsu Petrochemical Co., Ltd.) containing 0.2% by weight trimesic acid chloride, the coated porous base material was heat-treated in a hot blast dryer at 120° C. for 3 minutes to provide a composite semipermeable membrane of the present invention.

After treating an aqueous solution of 1500 ppm of sodium chloride having pH controlled to 6.5 using the composite semipermeable membrane for 30 minutes under the condition of 25° C. and an operation pressure of 5 kg/cm$^2$, the water flux and the sodium chloride rejection of the membrane were measured, whereby the performance of the membrane was obtained. The measurement results of the performance are shown in Table 1 below.

COMPARATIVE EXAMPLE 1

By following the same procedure as Example 1 except that the amine salt was not used, a comparative composite semipermeable membrane was prepared and the results of the performance of the membrane measured are shown in Table 1 below. As shown in the table, the water flux of the membrane is very small as compared with the membrane in Example 1.

COMPARATIVE EXAMPLES 2 TO 5

By following the same procedure as Example 1 except that m-phenylenediamine was used in place of 2,6-diaminotoluene and the other constituting components were changed as shown in Table 1 below, comparative composite semipermeable membranes 2 to 18 were prepared and performances of these samples are shown in Table 1 below. As shown in the table, the water flux of each of these membranes was very less as compared with the membrane in Example 1.

COMPARATIVE EXAMPLES 6 TO 8

By following the same procedure as Example 1 except that the mixing ratio of the other amino compound monomer was over 60% by weight to the amount of 2,6-diaminotoluene and also the constituting components were changed as shown in Table 1 below, comparative composite semipermeable membranes were prepared and the performances of these membranes are shown in Table 1 below. As shown in Table 1 below, the water flux is less than those of the membrane in Example 1 and the membranes in Examples 13 to 18.

TABLE 1

| | Base Liquid | | | | | Crosslinking Agent | | | Membrane Performance | |
|---|---|---|---|---|---|---|---|---|---|---|
| | | | Amine Salt | | Surfactant | | | | | |
| Sample No. | 26DAT (%) | MPD (%) | TEA (%) | CSA (%) | SLS (%) | TMC (%) | IPC (%) | CPTC (%) | Rejection (%) | Water Flux ($m^3/m^2$ day) |
| Example 1 | 2.0 | 0 | 2.0 | 4.0 | 0.25 | 0.20 | 0 | 0 | 92.6 | 1.05 |
| Comparative Example 1 | 2.0 | 0 | 0 | 0 | 0.25 | 0.20 | 0 | 0 | 77.5 | 0.35 |
| Comparative Example 2 | 0 | 2 | 0 | 0 | 0.25 | 0.10 | 0 | 0 | 99.3 | 0.08 |
| Comparative Example 3 | 0 | 2 | 0 | 0 | 0.25 | 0.20 | 0 | 0 | 99.2 | 0.04 |
| Comparative Example 4 | 0 | 2 | 2 | 4 | 0.25 | 0.20 | 0 | 0 | 99.5 | 0.29 |
| Comparative Example 5 | 0 | 2 | 2 | 4 | 0.25 | 0.10 | 0.15 | 0 | 99.6 | 0.26 |
| Example 2 | 2.0 | 0 | 2.0 | 4.0 | 0.25 | 0.15 | 0 | 0 | 88.2 | 1.39 |
| Example 3 | 2.0 | 0 | 2.0 | 4.0 | 0.25 | 0.25 | 0 | 0 | 92.5 | 1.01 |
| Example 4 | 2.0 | 0 | 2.0 | 4.0 | 0.25 | 0.30 | 0 | 0 | 94.6 | 0.75 |
| Example 5 | 2.0 | 0 | 2.0 | 4.0 | 0.25 | 0.15 | 0.225 | 0 | 81.3 | 0.44 |
| Example 6 | 2.0 | 0 | 2.0 | 4.0 | 0.25 | 0.20 | 0.10 | 0 | 88.6 | 0.92 |
| Example 7 | 2.0 | 0 | 2.0 | 4.0 | 0.25 | 0.20 | 0.20 | 0 | 92.6 | 0.64 |
| Example 8 | 2.0 | 0 | 2.0 | 4.0 | 0.25 | 0.20 | 0.30 | 0 | 95.6 | 0.40 |
| Example 9 | 2.0 | 0 | 4.0 | 8.0 | 0.25 | 0.20 | 0.30 | 0 | 90.4 | 0.54 |
| Example 10 | 2.0 | 0 | 2.0 | 4.0 | 0.25 | 0 | 0 | 0.08 | 87.8 | 0.51 |
| Example 11 | 2.0 | 0 | 2.0 | 4.0 | 0.25 | 0 | 0 | 0.10 | 87.3 | 0.50 |
| Example 12 | 2.0 | 0 | 2.0 | 4.0 | 0.25 | 0 | 0 | 0.20 | 82.6 | 0.61 |
| Example 13 | 1.5 | 0.5 | 2.0 | 4.0 | 0.25 | 0.15 | 0 | 0 | 97.7 | 0.80 |
| Example 14 | 1.5 | 0.5 | 2.0 | 4.0 | 0.25 | 0.10 | 0.15 | 0 | 95.0 | 0.61 |
| Example 15 | 2.0 | 0.25 | 2.0 | 4.0 | 0.25 | 0.20 | 0 | 0 | 98.5 | 0.59 |
| Example 16 | 2.0 | 0.5 | 2.0 | 4.0 | 0.25 | 0.20 | 0 | 0 | 99.1 | 0.51 |
| Example 17 | 2.0 | 0.75 | 2.0 | 4.0 | 0.25 | 0.20 | 0 | 0 | 99.3 | 0.46 |
| Example 18 | 2.0 | 1.0 | 2.0 | 4.0 | 0.25 | 0.20 | 0 | 0 | 99.4 | 0.41 |
| Comparative Example 6 | 2.0 | 1.25 | 2.0 | 4.0 | 0.25 | 0.20 | 0 | 0 | 99.4 | 0.39 |
| Comparative Example 7 | 2.0 | 1.5 | 2.0 | 4.0 | 0.25 | 0.20 | 0 | 0 | 99.4 | 0.37 |
| Comparative Example 8 | 2.0 | 2.0 | 2.0 | 4.0 | 0.25 | 0.20 | 0 | 0 | 99.4 | 0.32 |

26DAT: 2,6-Diaminotoluene
MPD: m-Phenylenediamine
TEA: Triethylamine
CSA: Camphorsulfonic acid
CPTC: Cyclopentanetetracarboxylic acid chloride
SLS: Sodium Laurylsulfate
TMC: Trimesic acid chloride
IPC: Isophthalic acid chloride

EXAMPLES 2 TO 18

By following the same procedure as Example 1 except that the constituting components were changed as shown in Table 1 below, composite semipermeable membranes of this invention were prepared and the performances of these membranes are shown in Table 1 below.

TEST EXAMPLE 1

After treating an aqueous solution containing 50 ppm of sodium hypochlorite and 1500 ppm of calcium chloride having pH adjusted to 8 for 86.5 hours under the condition of 25° C. and an operation pressure of 5 kg/cm² using the composite semipermeable membrane obtained by the same procedure as Example 1, the change of the membrane performance was determined. The results are shown in Table 2 below. As is clear from the results, it can be seen that lowering of the rejection of the membrane was not observed and thus the chlorine resistance of the composite semipermeable membrane was very excellent.

COMPARATIVE EXAMPLE 9

By following the same procedure as Example 1 except that 2,4-diaminotoluene was used in place of 2,6-diaminotoluene, a composite semipermeable membrane was prepared and on the composite semipermeable membrane, the chlorine resistant test was applied as in Test Example 1. The results are shown in Table 2 below. As is clear from the results of Table 2, the membrane was inferior in the chlorine resistance.

TABLE 2

| Sample No. | Basic Liquid | | Chlorine Resistant Test | | | |
|---|---|---|---|---|---|---|
| | | | Before Treatment | | After 86.5 hours | |
| | 26DAT (%) | 24DAT (%) | Rejection (%) | Water Flux (m³/m² day) | Rejection (%) | Water Flux (m³/m² day) |
| Test Example 1 | 2.0 | 0 | 87.3 | 1.24 | 92.7 | 0.87 |
| Comparative Example 9 | 0 | 2.0 | 97.4 | 0.73 | 13.4 | 6.79 |

26DAT: 2,6-Diaminotoluene
24DAT: 2,4-Diaminotoluene

COMPARATIVE EXAMPLE 10

By following the same procedure as Example 1 except that 2,5-diaminotoluene was used in place of 2,6-diaminotoluene, a comparative composite semipermeable membrane was prepared and on the membrane, the chlorine resistant test as in Test Example 1 was applied. The results are shown in Table 3 below. As shown in the table, the water flux before the treatment for the chlorine resistant test, that is, the initial water flux of the membrane was very less and also the membrane was inferior in the chlorine resistance.

TABLE 3

| Sample No. | Basic Liquid | | Chlorine Resistant Test | | | |
|---|---|---|---|---|---|---|
| | | | Before Treatment | | After 14 hours | |
| | 26DAT (%) | 25DAT (%) | Rejection (%) | Water Flux (m³/m² day) | Rejection (%) | Water Flux (m³/m² day) |
| Comparative Example 10 | 0 | 2.0 | 92.0 | 0.04 | 11.2 | 3.83 |

26DAT: 2,6-Diaminotoluene
25DAT: 2,5-Diaminotoluene

Since the composite semipermeable membrane of the present invention has very improved water flux and desalting property at a low pressure operation as compared with conventional composite semipermeable membranes, the composite semipermeable membrane can be suitably used, particularly, in the field of aiming at desalting of an aqueous solution under a low osmosis pressure.

While the invention has been described in detail with reference to specific embodiments, it will be apparent to one skilled in the art that various changes and modifications can be made to the invention without departing from its spirit and scope.

What is claimed is:

1. A liquid separation composite semipermeable membrane comprising a porous base material having formed thereon a semipermeable thin film formed by crosslinking interfacial polymerization of a 2,6-diaminotoluene monomer with a polyfunctional crosslinking agent having at least two functional groups capable of reacting with amino groups of the monomer, wherein the interfacial polymerization takes place in the presence of an amine salt.

2. The composite liquid separation semipermeable membrane of claim 1, wherein the composite semipermeable membrane has a faculty of a salt rejection of at least 80% to an aqueous solution of 1500 ppm of sodium chloride under the condition of 25° C. and a pressure of 5 kg/cm² together with a faculty of a water flux of at least 0.4 m³/m² per day.

3. The composite liquid separation semipermeable membrane of claim 1, wherein the mixing ratio of the other amino compound monomer is not more than 60% by weight to the 2,6-diaminotoluene monomer.

4. The composite liquid separation semipermeable membrane of claim 1, wherein the other amino compound monomer is m-phenylenediamine, the amine salt is a salt composed of triethylamine and camphorsulfonic acid, and the polyfunctional crosslinking agent is trimesic acid chloride.

5. A production method of a composite liquid separation semipermeable membrane, which comprises coating or impregnating a porous base material with a solution containing (1) 2,6-diaminotoluene monomer or a mixture of 2,6-diaminotoluene monomer and other amino compound monomer and (2) an amino salt and thereafter, contacting the coated or impregnated layer with a polyfunctional crosslinking agent having at least two functional groups capable of reacting with the amino group(s) of the monomer(s) to cause an interfacial crosslinking polymerization, thereby to form a semipermeable thin film on the porous base material.

6. The production method of claim 5, wherein the composite liquid separation semipermeable membrane has a faculty of a salt rejection of at least 80% to an aqueous 1500 ppm of sodium chloride in the operation under the condition of 25° C. and an operation pressure of 5 kg/cm$^2$ together with a faculty of a water flux of at least 0.4 m$^3$/m$^2$ per day.

7. The production method of claim 5, wherein the mixing ratio of the other amino compound monomer is not more than 60% by weight to the 2,6-diaminotoluene monomer.

8. The production method of claim 5, wherein the other amino compound monomer is m-phenylenediamine, the amine salt is a salt composed of triethylamine and camphorsulfonic acid, and the polyfunctional crosslinking agent is trimesic acid chloride.

9. A composite liquid separation semipermeable membrane comprising a porous base material having formed thereon a semipermeable thin film formed by crosslinking interfacial polymerization of a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

10. The composite liquid separation semipermeable membrane of claim 9, wherein the composite semipermeable membrane has a faculty of a salt rejection of at least 80% to an aqueous solution of 1500 ppm of sodium chloride in the operation under the condition of 25° C. and a operation pressure of 5 kg/cm$^2$ together with a faculty of a water flux of at least 0.4 m$^3$/m$^2$ per day.

11. The composite liquid separation semipermeable membrane of claim 9, wherein the mixing ratio of the other amino compound monomer is not more than 60% by weight to the 2,6-diaminotoluene monomer.

12. The composite liquid separation semipermeable membrane of claim 9, wherein the other amino compound monomer is m-phenylenediamine, the amine salt is a salt composed of triethylamine and camphorsulfonic acid, and the polyfunctional crosslinking agent is trimesic acid chloride.

13. A liquid separation method, comprising:

applying, to a liquid, a composite semipermeable membrane comprising a porous base material having formed thereon a semipermeable thin film formed by crosslinking interfacial polymerization of:
  (a) a 2,6-diaminotoluene monomer with a polyfunctional crosslinking agent having at least two functional groups capable of reacting with amino groups of the monomer, or
  (b) a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

14. A method of producing fresh water, comprising:

applying, to a liquid, a composite semipermeable membrane comprising a porous base material having formed thereon a semipermeable thin film formed by crosslinking interfacial polymerization of:
  (a) a 2,6-diaminotoluene monomer with a polyfunctional crosslinking agent having at least two functional groups capable of reacting with amino groups of the monomer, or
  (b) a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

15. A method of desalting water comprising:

applying, to a liquid, a composite semipermeable membrane comprising a porous base material having formed thereon a semipermeable thin film formed by crosslinking interfacial polymerization of:
  (a) a 2,6-diaminotoluene monomer with a polyfunctional crosslinking agent having at least two functional groups capable of reacting with amino groups of the monomer, or
  (b) a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

16. A method of producing ultra-pure water comprising:

applying, to a liquid, a composite semipermeable membrane comprising a porous base material having formed thereon a semipermeable thin film formed by crosslinking interfacial polymerization of:
  (a) a 2,6-diaminotoluene monomer with a polyfunctional crosslinking agent having at least two functional groups capable of reacting with amino groups of the monomer, or
  (b) a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

17. A method of desalting an aqueous solution comprising:

applying, to a liquid, a composite semipermeable membrane comprising a porous base material having formed thereon a semipermeable thin film formed by crosslinking interfacial polymerization of:
  (a) a 2,6-diaminotoluene monomer with a polyfunctional crosslinking agent having at least two functional groups capable of reacting with amino groups of the monomer, or
  (b) a mixture of a 2,6-diaminotoluene monomer and another amino compound monomer with a polyfunctional crosslinking agent having at least two functional groups capable of reacting with amino groups of the monomers, wherein the interfacial polymerization takes place in the presence of an amine salt.

* * * * *